March 1, 1949.  H. H. CARY ET AL  2,462,843
GLASS ELECTRODE
Filed Feb. 7, 1945
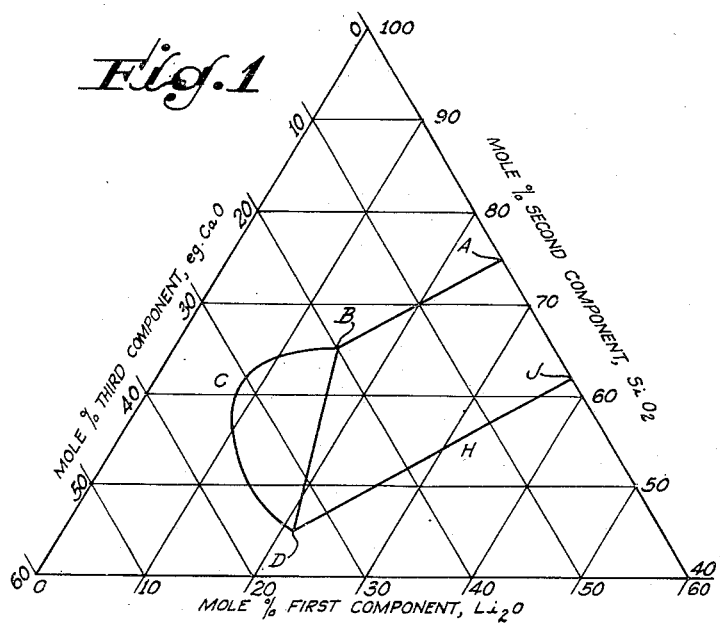
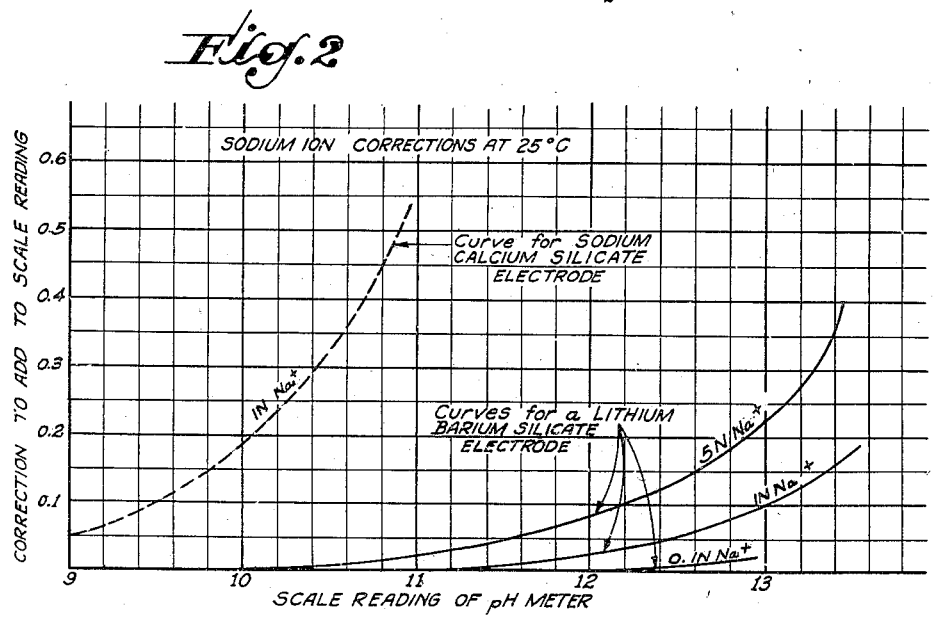
INVENTORS
HENRY H. CARY
WARREN P. BAXTER
BY HARRIS, KIECH, FOSTER & HARRIS
FOR THE FIRM
ATTORNEYS Patented Mar. 1, 1949

2,462,843

UNITED STATES PATENT OFFICE 2,462,843

GLASS ELECTRODE

Henry H. Cary, Alhambra, and Warren P. Baxter, Pasadena, Calif., assignors to National Technical Laboratories, South Pasadena, Calif., a corporation of California Application February 7, 1945, Serial No. 576,532

20 Claims. (Cl. 204—195)

This invention relates to glass electrodes of the type commonly employed for pH measurement.

As frequently constructed, the glass electrode consists of a membrane of glass of low electrical resistance, typically in the form of a thin walled bulb blown on a supporting tube of a glass having a high electrical resistance, such as shown in our Patent No. 2,256,733. When the bulb is immersed in a solution and the proper electrical precautions are taken, it is found that the potential of the inner surface of the bulb with respect to the solution depends primarily on the pH of the solution. When the pH is below 9.0, the potential varies with the pH in the same manner as the hydrogen electrode, and a measurement of this potential, therefore, may be used as a measure of the pH of the solution. It is of great technical importance that, in this pH range, the potential of the glass electrode is unaffected by the presence of oxidizing or reducing agents, dissolved salts, or organic compounds that preclude the use of other pH measuring electrodes. This unique feature allows the glass electrode to be used in cases where no other method is applicable and, having the additional advantage that no difficulties are encountered with solutions that contain dissolved gases or are poorly buffered, highly colored, or viscous, the glass electrode has almost completely displaced all other methods for routine pH measurement.

Unfortunately, in the pH range above 9.0, the potential of the glass electrodes in common use does not depend exclusively on the hydrogen ion concentration but varies also with the concentration of other positive ions in the solution. In particular, the glass electrode potential depends to a considerable extent on the concentrations of the lithium, sodium, and potassium ions present. These deviations of the glass electrode from the theoretical hydrogen electrode behavior in alkaline solutions are referred to as the "alkaline errors" of the glass electrode, that error resulting from the presence of sodium ions being termed the "sodium ion error," etc.

Since the sodium ion is a common constituent of alkaline solutions, the existence of sodium ion error seriously hampers the application of the glass electrode to the determination of the pH of alkaline solutions. Measurement of the pH of such solutions with the glass electrode can be made only by determining the alkali metal concentration and estimating the alkaline error correction to be applied to the observed pH. In most cases, it is difficult to determine the alkali metal ion concentration and, in any event, the error can only be roughly estimated. In consequence, the reliability of the glass electrode decreases rapidly as the pH is raised above 10.0, rendering it almost useless above a pH of 12.0. In view of the fact that all other pH measuring methods have idiosyncrasies that preclude their use in this pH range in most cases of technical importance, a longstanding need is felt for an accurate method of measuring the pH of the strongly alkaline solutions employed in the tanning, electroplating, detergent, synthetic fiber, and other chemical processing industries.

It is an object of the present invention to provide a glass electrode for the measurement of pH values, particularly in highly alkaline solutions. It is a further object to produce an improved glass electrode which is less subject to errors due to the presence of sodium ions in the solution under measurement than the electrodes in common use.

It is a further object of the present invention to provide an electrode having a lower electrical resistance than ordinary electrodes of the same dimensions.

A further object is to provide a method and means for the accurate determination of pH and/or alkali metal ion concentrations.

A further object is to provide improved glass compositions, with particular reference to their use in glass electrodes.

An outstanding feature of the present invention is the use of an electrode glass for the construction of the conductive, ion-sensitive membrane which is characterized by the presence of lithium oxide. It is an object of the invention, in one of its embodiments, to provide a glass electrode containing lithium oxide, silica, and, as a third component, essentially an oxide of a divalent metal, or another oxide of a metal which acts as a first-mentioned oxide in a glass composition, or mixtures of such divalent oxides and/or such other oxides, this third component being preferably an alkaline earth component, whereby the glass electrode is much less subject to sodium ion error than the sodium-calcium-silicate glasses used in conventional practice.

Another object of the invention is to provide a glass electrode for pH determinations comprising a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO and MgO, the mole per cent of said second component minus the mole per cent of said first component being between 24 and 50 in compositions containing CaO, PbO or MgO, being between 24 and about 52 in compositions containing SrO, and being between 24 and about 53 in compositions containing BaO, the mole per cent of said first component plus 0.3 times the mole per cent of said second component being greater than about 34.6 or the mole per cent of the third component being less than about 20 mole per cent.

Other objects and features will become apparent in the following description, wherein reference is made to the drawing, in which:

Fig. 1 is a triangular phase diagram or triaxial diagram showing compositions expressed in terms of mole per cent for the three-component glass system: $Li_2O$, CaO, and $SiO_2$; and Fig. 2 is a graph showing as ordinates sodium ion errors for the preferred electrodes of this invention and for other electrodes in solutions of different sodium ion concentrations, plotted against uncorrected pH scale readings as abscissae.

We have discovered that it is technically feasible to make a glass from the components lithium oxide, calcium oxide, and silica over extended ranges of compositions. The most suitable compositions are in the region bounded by ABCDHJ and the right-hand edge of the diagram in Fig. 1. Furthermore, we find that electrodes made from such compositions do respond to changes in hydrogen ion concentration. In general, best electrode properties will be found with compositions lying in the trapezoidal region bounded by the lines ABDHJ.

We find that, for the best results, the quantity of lithia should be adjusted with respect to the quantity of silica and should preferably exceed a minimum quantity which is variable according to the quantity of silica. The preferred relationship may be expressed by stating that the mole per cent of silica minus the mole per cent of lithia should not be greater than 50. This relationship is particularly desirable for compositions containing less than about 20 mole per cent of the oxide of a divalent metal, typically calcium oxide, and is depicted graphically on the diagram of Fig. 1 by the upper boundary line AB, which runs up to about 20 mole per cent CaO.

We find further that, for best results, the quantity of lithia should preferably not exceed a maximum quantity which is variable with the silica content. This preferred relationship may be expressed by stating that the mole per cent of silica minus the mole per cent of lithia is not less than 24 and, in Fig. 1, the lower boundary line DHJ corresponds to this relationship.

The best electrodes for general use are made with from 0 to 20% or more of an oxide of a divalent metal, typically calcium oxide. The 0% concentration corresponds to a pure lithium silicate as found directly on the right-hand boundary of the diagram. Such lithium silicate glasses may be employed, but are usually improved by the incorporation of at least a few mole per cent of an oxide of a divalent metal, or CaO as shown in Fig. 1. In manufacturing such electrodes for general use, as distinct from the high temperature use disclosed in our Patent No. 2,383,709, it is preferable, however, to maintain the CaO content below a maximum value, which maximum is variable according to the proportions of lithium and silica. The preferred maximum for such electrodes is indicated in Fig. 1 by the left boundary line BD, and the indicated relationship may be expressed mathematically by stating that the mole per cent of lithium oxide plus 0.3 times the mole per cent of silica should exceed about 34.6. In electrode glasses for high temperature use, the compositions may be to the left of the line BD but, generally, within the curve BCD.

Electrodes constructed from lithium-calcium-silicate glass compositions lying within the trapezoidal area ABDHJ (or within the area ABCDHJ for high temperature use) possess the general features requisite in glass electrodes, as well as the unique feature of low sodium ion error. The feature of low error will presently be developed more fully. With regard to the general features, the following may be noted.

It is preferable to avoid devitrification in the electrode glass, and electrodes from compositions within the area ABDHJ will be found satisfactory in this respect. Compositions in the immediate vicinity of the boundary line AB are preferably cooled rapidly from the molten state in order to avoid any tendency for the glass to devitrify by separation into two phases.

Another feature which is generally desirable is durability in the presence of water and moisture. Compositions selected from the preferred area are very satisfactory in this respect. The general trend is for the chemical resistance to decrease as the proportions of silica and calcium are decreased, and compositions which lie below the boundary DHJ may develop a cloudy "weathered" surface even after a few days' exposure to atmospheric moisture. Further, and particularly true as regards lithium-calcium-silicate glasses, we find that compositions above the boundary DHJ, and within the area ABDHJ, are substantially better and more commercially usable than those having a composition below this boundary. In changing from a zone above this boundary to a zone below this boundary, it becomes increasingly difficult to make commercially usable electrodes, and it has been our experience that compositions of blown glass electrodes lying below this boundary are commercially impractical. In changing from a composition above the boundary to a composition therebelow (by reducing the mole per cent of $SiO_2$ and increasing the mole per cent of $Li_2O$), the following difficulties are encountered, increasing with the distance below the boundary. In the first place, the glass tends to become very difficult to blow. The working range in temperature becomes very small as the material changes from molten to solid state with a very small change in temperature, and blowing must be accomplished at a precise moment. Further, the glass in molten state has very little viscosity and, if mouth-blown, will tend to elongate to a size far greater than desired. Additionally, below the boundary DHJ, the glass tends to become crystalline, resembling a fused salt rather than glass. In the second place, the coefficient of expansion becomes so different from that of lead glass or other desirable body glass as to tend to prevent satisfactory seals between the body glass and the electrode bulb. In the third place, as mentioned above, the glass compositions experience progressively reduced durability to water and tend to develop a cloudy or weathered look even after a few days' exposure to atmospheric moisture.

Another generally desirable feature in glass electrodes is that of a reasonably low electric resistance. With the pH measuring equipment commercially available at the present time, it is impractical to use glass electrodes whose resistance exceeds a few thousand megohms. This, in turn, makes it impractical to employ glasses having specific resistances over about 1000 times that of Corning 015 for pH measurements at room temperatures. (Corning 015 is a trade name for a glass now almost universally employed for the construction of the conductive membranes of glass electrodes and having a composition in terms of mole per cent approximately as follows: $Na_2O$, 21.4; CaO, 6.4; and $SiO_2$, 72.2, and having a specific electrical resistance in the order of $10^{10}$ ohms.)

We have determined the ratio of the specific resistance of various lithium-silicate glasses containing calcium, strontium, or barium (see infra) to the specific resistance of Corning 015 and find that this ratio is given approximately by:

$$R_L/R_{015} = 10^{(11.6 - .256X)}$$

where $X = $ (mole percent $Li_2O$) $+ 0.3$ (mole percent $SiO_2$).

From the practical considerations which limit the specific resistance of the electrode glass to about 1000 times that of Corning 015, it may be derived from the above formula that the mole per cent of lithium oxide plus 0.3 times the mole per cent of silica should exceed about 34.6%; i. e., the composition should preferably remain to the right of the line BD of Fig. 1 to meet the practical considerations. In other words, compositions of suitably low resistance for ordinary use are found in the preferred trapezoidal area. It will be readily understood that the limit of composition indicated by the left-hand boundary BD may be exceeded as far as resistance is concerned if the electrodes are to be used at very elevated temperatures where their resistance is lower, or if suitable improvements are made in the construction of the electrodes and associated electrical equipment. Thus, we can use glass compositions having an operative specific electrical resistance less than about $10^{13}$ ohms, by which we have reference to the specific electrical resistance at the intended operating temperature of the electrode. In such instances of high temperature use, glass compositions within the area ABCDHJ are satisfactory. To the left of the line BD, however, it becomes increasingly difficult, though not impossible within the compositions mentioned above, to fabricate glass electrodes.

When constructed from glass compositions within the limits ABDHJ of Fig. 1, we find that lithium-calcium-silicate electrodes are extremely useful for pH measurement. For measurements on solutions whose pH is below 10.0, these electrodes may have no special advantage over the usual Corning 015 electrode. However, in more alkaline solutions, when used with the technique described later, they have very real advantages and are capable of measuring the pH of solutions as difficult as 1.0 N sodium hydroxide with fair accuracy. Except for those glass compositions containing less than three mole per cent of calcium oxide, the sodium ion error of the lithium electrodes is low and practically independent of glass composition, the error in 1 N sodium hydroxide being about 35 millivolts as compared with 180 millivolts for Corning 015 glass. The sodium ion error increases somewhat when the calcium oxide content of the glass is reduced below three mole per cent, but even when calcium oxide is entirely absent from the glass, the sodium ion error is smaller than that of Corning 015.

Within the limits of composition indicated above, there is no outstanding reason for preferring one lithium-calcium-silicate glass composition over another. In general, compositions relatively high in silica and low in lithium oxide display the best durability, but this benefit is achieved at the expense of increased electrode resistance. We prefer to employ, as representing the best balance of the various factors for general use, a glass whose composition in mole per cent is substantially: lithium oxide, 25; calcium oxide, 7; and silicon dioxide, 68. The specific resistance of this glass is somewhat greater than that of Corning 015 but near enough thereto to permit fairly rugged electrodes to be made with a reasonable value of electrical resistance. This glass may be made easily by the methods described below and gives no trouble with devitrification. Its coefficient of expansion matches that of ordinary lead glass and lime glass tubing well enough to allow good seals to be made between the lithium glass bulb and supporting tubes of these materials.

We have discovered that strontium oxide may be substituted on a mole per cent basis either in whole or in part for the calcium oxide in the lithium-calcium-silicate electrodes. The electrodes containing strontium oxide or mixtures of strontium and calcium oxides do not differ markedly from those containing calcium oxide alone. The range of compositions yielding satisfactory electrodes containing strontium oxide is substantially the same as outlined for glasses containing calcium, although the line AB may be raised one or two mole per cent. The specific resistance of the strontium glasses is approximately the same as for the corresponding calcium glass, and the sodium ion error is slightly lower, being about 25 millivolts in 1.0 N sodium hydroxide.

We have also discovered that barium oxide may be substituted on a mole per cent basis either in whole or in part for the calcium oxide in lithium-calcium-silicate electrodes. In most respects, the glasses containing barium oxide are very similar to the corresponding calcium glass. A lithium glass containing barium oxide appears to have a smaller tendency to devitrify than the corresponding calcium glass, with the result that the limit AB (Fig. 1) may be exceeded by two or three mole per cent; otherwise, the range of compositions yielding satisfactory electrodes is substantially the same in the two cases. The specific resistance of the glass containing barium is slightly higher than that of the corresponding calcium glass, but the difference is not large enough to have practical significance.

The lithium-barium-silicate glasses have an outstanding advantage over all other glasses investigated by us in that they yield electrodes having the lowest sodium ion errors. When the barium oxide content is above three mole per cent, the sodium ion error is practically independent of composition and amounts to about 12 millivolts in 1 N sodium hydroxide. We have made electrodes from a large number of lithium-barium-silicate glass compositions within the limits outlined above and find that no particular composition has outstanding advantages over the others. As with the calcium glasses, it is preferable to use compositions relatively high in silica and barium oxide in order to secure good durability, but, as pointed out previously, there is little point in using compositions yielding electrodes of unusually high resistance, except as they may be designed for special purposes, e. g., high temperature operation as disclosed in our Patent No. 2,383,709. A glass whose approximate composition in mole per cent is lithium oxide 24.3, barium oxide 7, and silica 68.7 has been chosen by us as being a good compromise between ease of working, durability, and specific resistance. For the measurement of the pH of strongly alkaline solutions at room temperature, electrodes made from this glass embody our invention in a preferred form, and their construction and use will be more fully described below.

For some applications, it is desirable to produce glass electrodes with an electrical resistance of 0.5 megohm or less so as to permit the direct reading of the electrode potential with a sensitive galvanometer instead of the vacuum tube amplifier commonly used. In the past, this has been accomplished by making the electrode bulb relatively large and very thin—a design that leads to a fragile, easily broken electrode. Desirably, this object could be attained with more rugged electrodes by employing an electrode glass having a low specific resistance. In accordance with the formula given previously, the use of a relatively large amount of lithium oxide will yield electrode glasses of low specific resistance, and this modification results in a very useful application of our invention. However, increase of the percentage of lithium oxide beyond certain limits impairs the durability of the resulting electrodes and introduces errors in the pH measurement of poorly buffered solutions.

We have discovered a glass which largely overcomes this difficulty. We find that glasses composed of lithium oxide, lead oxide (PbO), and silica have specific resistances less than one-fiftieth of that of the corresponding lithium-calcium-silicate glasses and yet have satisfactory durability. For example, a glass having the approximate composition in mole per cent; lithium oxide, 29.3, lead oxide (as PbO), 8.2, and silica, 62.5, has specific resistance approximately 0.004 times that of Corning 015 glass. Small, rugged electrodes having resistances of 0.5 megohm or less may be made from this glass. We find such electrodes to have satisfactory chemical durability and to give accurate pH readings in both acid and alkaline solutions. The sodium ion error of these electrodes is much lower than that of Corning 015 electrodes, being about 55 millivolts in 1 N sodium hydroxide.

Other compositions containing lead oxide may be used in making glass electrodes. In general, lithium-lead-silicate glasses have a tendency to produce lumpy, striated electrode bulbs, and this tendency becomes more pronounced as the silica and lead content is increased. Although such visible imperfections appear to have no effect on the pH measuring properties of the electrodes, it usually is preferable for the sake of appearances to use compositions relatively low in silica. Aside from this, the range of compositions yielding satisfactory electrodes is about the same as that indicated previously for the corresponding lithium-calcium-silicate electrodes, and lead oxide may be substituted in whole or in part for the other alkaline earth components mentioned. However, because of the lower specific resistance of the lead glasses, the boundary BD is not so important, and electrodes of satisfactory low resistance for ordinary or high temperature use can be made from compositions to the left thereof within the area BCD. Although lead is not an alkaline earth metal, lead oxide behaves in glasses very much like the alkaline earth oxides and, therefore, it is proper to classify it with the alkaline earth components of a glass.

When magnesium oxide or beryllium oxide is used as the alkaline earth component of an electrode glass, the electrode exhibits relatively large sodium ion errors in alkaline solution, the beryllium electrode showing considerably greater error than Corning 015. Indeed, beryllium oxide glasses respond to pH changes in the ideal manner only in a narrow pH range in acid solution. The magnesium oxide glass is slightly more accurate than Corning 015. For this reason, these alkaline earth components are not useful in constructing glass electrodes for lowest error pH measurement except as they may be mixed with CaO, SrO, BaO, PbO, or other oxide of a divalent metal to form the third component of the glass. However, it occasionally is desired to estimate the concentration of sodium or other small positive ions in alkaline solutions and, for this purpose, such glass electrodes are well suited. For example, it may be desired to determine the sodium ion concentration of a certain alkaline solution for the purpose of estimating the sodium ion error correction to be applied to a glass electrode pH measurement made with an electrode having a known but small sodium ion error. To this end, a lithium-beryllium-silicate electrode may be calibrated in several solutions of different pH and sodium ion concentration, and a measurement made of its potential in the unknown alkaline solution. On the basis of the calibration and of the approximately correct pH value indicated by the pH measuring electrode, the beryllium electrode potential may then be interpreted in terms of the sodium ion concentration of the unknown and the sodium ion error of the pH measuring electrode estimated. It will be clear that this method permits a precise determination of both pH and sodium ion concentration and, with obvious modifications, of other alkali metal ions.

We find that the range of compositions suitable for making glass electrodes from lithium oxide, silica, and beryllium or magnesium oxides is approximately the same as outlined for the lithium-calcium-silicate glasses, and that beryllium oxide or magnesium oxide may be substituted on a mole per cent basis, either in whole or in part, for the calcium oxide in the lithium-calcium-silicate composition. The specific resistance of the beryllium glasses is approximately one-fifth of that of the corresponding calcium glasses. The magnesium glasses have about the same specific resistance as the calcium glasses. If the third component of the glass is a mixture, as mentioned in the preceding paragraph, the magnesium oxide in such a mixture may be in any proportion but the beryllium oxide in such a mixture should not be present in too large a proportion if the glass electrode is to have a sodium ion error less than Corning 015. Larger proportions can be employed in mixtures involving barium than in those involving calcium, strontium, or lead because of the lower sodium ion error of the barium glasses.

We have determined the effect of adding small amounts (up to 10 mole per cent) of various other metallic oxides to typical lithium-calcium and lithium-barium-silicate glasses. Sodium and potassium oxides increase the sodium ion error and produce a relatively enormous increase in the resistance when present in a lithium glass. Even in amounts as small as 0.5 mole per cent, the presence of sodium oxide more than doubles the specific resistance of the preferred lithium-barium-silicate glass and produces a noticeable increase in sodium ion error. In general, alkali metal oxides other than lithium are to be avoided even as impurities in constructing lithium glass electrodes of the lowest possible sodium ion error.

Various other oxides of divalent metals, such as CoO, MnO, etc., at least in amounts up to five mole per cent, seem to behave like alkaline earth components and produce about the same effect on the glass properties as the addition of the same amount of calcium oxide. In some cases, such oxides are useful for coloring the glass for the purposes of identification. As is well known, cobalt oxide produces an intense blue coloration. It will be noted that PbO, the alkaline earth oxides, and oxides such as CoO and MnO may be generally classed as oxides of divalent metals.

The oxides of trivalent metals, for example $Al_2O_3$ and $B_2O_3$, greatly increase the sodium ion error of the lithium glass electrodes and, in cases where the sodium ion error is to be reduced to a minimum, they should not be present in amounts exceeding a few tenths of a per cent. In other cases, alumina may be added to the extent of a few mole per cent with beneficial results. It appears to reduce the tendency toward devitrification, to increase the durability, and to retard the aging that takes place when glass electrodes are exposed to acid solutions for long periods. Aluminum and boric oxides may be regarded as substituting for silica in the glass compositions.

The glasses described here may be made easily by the methods familiar to glass technologists. Lithium carbonate, silica, and the alkaline earth carbonates are convenient raw materials from which to make these glasses. We use the "C. P." grade of these chemicals since, as mentioned above, certain impurities have an appreciable effect on the glass electrodes when present in amounts as small as one-half per cent. For this same reason, the fusion of the raw materials should be conducted in a platinum crucible, and the stirring of the fused mixture should be done with a platinum stirring rod. In making glasses containing lead, the atmosphere of the furnace must be carefully controlled to avoid reduction of the lead oxide.

It is expeditious to blow glass electrode bulbs directly from the fused glass in the crucible, particularly in the case of those glasses showing a tendency to devitrify when cooled slowly. To do this, a supporting tube of suitable size and shape is prepared and its end heated to incipient redness in the flame of a burner. The hot end is then touched evenly to the surface of the molten glass, care being taken to insure a uniform contact with molten glass around the circumference of the end of the tube. The tube is then withdrawn, carrying with it a small drop of the molten glass which, when cooled to the proper working temperature, may be blown out into a spherical bulb. By adjusting the temperature of the molten glass and selecting the proper diameter of tube, different amounts of glass may be withdrawn from the furnace as required for the particular size and electrical resistance of the bulb desired. This method is described in greater detail in our Patent No. 2,346,470.

In general, the glass electrodes of this invention are used in the same manner as other glass electrodes. However, in highly alkaline solutions, the lithium-silicate electrodes exhibit a behavior not ordinarily encountered with other glass electrodes:

(a) When placed in a highly alkaline solution (e. g., 1 N NaOH) the electrode does not instantly assume equilibrium but may indicate a gradually increasing pH for ten minutes or more.

(b) The asymmetry potential (zero correction) tends to change when the electrode is immersed in solutions of high pH. This change is usually in the direction of giving lower pH readings. In combination with the sluggishness noted in (a), this effect will usually give a time curve of pH readings reaching a maximum in approximately five minutes, followed by slowly decreasing readings.

(c) As the electrode ages, both of the phenomena noted above take place more slowly; that is, the response to pH changes becomes more sluggish and the change in asymmetry potential takes place more slowly.

These phenomena cause a small uncertainty in the results of a pH measurement. However, this difficulty is pronounced only in extremely alkaline solutions, and in most cases results reproducible to better than 0.1 pH unit may be obtained by making frequent buffer calibration of the electrode in the usual manner. For the best results in highly alkaline solutions, the following procedure is recommended:

1. After prolonged service, the response of the glass electrode may become excessively sluggish due to aging effects. Under some conditions of blowing, freshly made electrodes also exhibit this effect, as well as undue asymmetry correction. To avoid error from this source, all new electrodes and electrodes that have become severely aged should be subjected to the treatment outlined in our Patent No. 2,366,489, entitled "Glass electrode and method." This treatment may be performed as follows: Prepare a solution containing 20% of ammonium bifluoride in a waxed paper cup or paraffined beaker. Immerse the bulb portion of the electrode in this solution for three minutes, and then allow it to soak over night in pH 10.0 buffer. This procedure should be used only when necessary as the bifluoride solution has an etching action on the glass. When not in use, soak the glass electrode in a pH 10.0 buffer.

2. Connect the glass electrode and a suitable calomel electrode to a pH meter, and place the meter in operation in the usual manner. Immerse the electrodes in a pH 10.0 buffer solution and, after allowing a moment for equilibrium to take place, set the asymmetry potential corrector so that the meter indicates the pH of the buffer solution.

3. Rinse the electrodes with distilled water, flush the calomel electrode, and immerse the electrodes in the test sample. Note the pH reading at convenient time intervals, for example, one minute, three minutes, and five minutes after immersion. If appreciable upward drift in the readings occurs at the end of five minutes, the readings should be continued for ten minutes or more. For approximate work, the maximum pH reading may be taken as the correct reading for the sample.

4. For maximum accuracy, the buffer standardization should be repeated immediately after taking the final reading on the test sample. Clean the electrodes, immerse in a pH 10.0 buffer, and allow about one-half minute for equilibrium to be attained. If the pH reading does not agree exactly with the buffer pH, subtract the reading from the buffer pH and add the difference to the final pH reading of the test sample to obtain the correct reading.

In the above procedure, it is assumed that a pH meter was used having an asymmetry potential compensator and a scale reading directly in pH units, such as described in our Patent No. 2,232,221. Other types of instruments may be used with obvious modifications in the procedure.

When used in the above manner, electrodes made from the preferred barium glass give results reproducible to better than .02 pH in alkaline solutions. In most cases, the correction to be applied to the pH meter reading to correct for the effect of sodium ion is quite small and may be accurately estimated. The full line curves of Fig. 2 show the correction to be added to the scale reading of the pH meter for different sodium ion concentrations when using lithium-barium-silicate glass of the specifically preferred composition (7% BaO, 24.3% Li$_2$O, and 68.7% SiO$_2$). Thus, 1 N sodium hydroxide, which, with the preferred electrode, gives an experimental scale reading of 13.55, produces a sodium ion error of only 0.19 pH, the true pH being 13.55+.19=13.74.

In Fig. 2, the dotted curve gives the correction to be applied to the readings of electrodes made from Corning 015 glass, and it is apparent that such electrodes are quite inferior to the electrodes of our invention. In effect, our preferred glass adds approximately 3.5 pH units to the useful range of the glass electrode pH meter.

The term "comprising essentially" employed in some of the claims does not exclude other materials so long as the essential functions of the recited combination of the materials are preserved. Thus, for example, the term "comprising essentially lithium oxide" does not exclude small amounts of other alkali metal oxides as long as these other oxides do not materially change the effect of the lithium oxide in the composition. Similarly, the term "comprising essentially silica" does not exclude the presence of small amounts of other materials such as aluminum oxide and boron oxide up to about 3 mole per cent, as such materials may be employed in small amounts with advantageous effect upon the chemical durability and other properties of the electrodes. So, also, the term "comprising essentially," as applied to the third component, does not, even if employed with reference to a Markush group, exclude, for example, small amounts of other oxides of divalent metals as cobalt oxide or manganese oxide may, for example, be used in small amounts primarily to impart a distinctive color to the composition.

The term "at least one" of the materials selected from a specified Markush group covers the employment of single members of the group as well as mixtures thereof.

This application is a continuation-in-part of our application entitled "Glass electrode," Serial No. 356, 778, filed September 14, 1940 (now abandoned).

It is to be understood that the details of the above description are intended as exemplary rather than limiting, and that various modifications of the described embodiment may be made and used without departing from the essence of our invention as defined by the scope of the appended claims.

We claim as our invention:

1. A glass electrode for pH determinations, comprising: a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO and MgO, said third component containing at least two of said materials when MgO is one of the materials selected from said group, the mole per cent of silica minus the mole per cent of lithium oxide being between 24 and 50 and the mole per cent of lithium oxide plus 0.3 times the mole per cent of silica being greater than 34.6.

2. A glass electrode for pH determinations, comprising: a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO and MgO, said third component containing at least two of said materials when MgO is one of the materials selected from said group, the mole per cent of silica minus the mole per cent of lithium oxide being between 24 and 50 and the mole per cent of lithium oxide plus 0.3 times the mole per cent of silica being greater than 34.6, said third component being at least 3 mole per cent of said composition.

3. A glass electrode for pH determinations, comprising: a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO and MgO, said third component containing at least two of said materials when MgO is one of the materials selected from said group, and at least one material present in amount not over about 5 mole per cent and selected from the group consisting of CoO and MnO, the mole per cent of silica minus the mole per cent of lithium oxide being between 24 and 50 and the mole per cent of lithium oxide plus 0.3 times the mole per cent of silica being greater than 34.6, said third component being at least 3 mole per cent of said composition.

4. A glass electrode for pH determinations, comprising: a conductive membrane of glass, said glass having a three-component composition, the first component comprising essentially lithium oxide uncontaminated by the presence of more than a very small amount of any other alkali metal oxide, the second component comprising essentially silica, and the third component representing the balance of the composition and comprising essentially at least one material selected from the group consisting of CaO, SrO, BaO, PbO and MgO, said third component containing at least two of said materials when MgO is one of the materials selected from said group, the mole per cent of silica minus the mole per cent of lithium oxide being between 24 and 50 and the mole per cent of lithium oxide plus 0.3 times the mole per cent of silica being greater than 34.6, the glass of said composition being characterized by the absence of any more than a small amount of any oxide of a trivalent metal.

5. A glass electrode as defined in claim 4, in which the membrane contains a small amount of a material selected from the group consisting of aluminum oxide and boron oxide in an amount not more than a few mole per cent.

6. A glass electrode for pH determinations, comprising: a conductive membrane of glass, said glass having a three-component composition, the first component comprising essentially lithium oxide, the second component comprising essentially silica, and the third component representing the balance of the composition comprising essentially calcium oxide, the mole per cent of silica minus the mole per cent of lithium oxide being between 24 and 50 and the mole per cent of lithium oxide plus 0.3 times the mole per cent of silica being greater than 34.6.

7. A glass electrode for pH determinations, comprising: a conductive membrane of glass, said glass containing approximately 25 mole per cent lithium oxide, 7 mole per cent calcium oxide, and approximately 68 mole per cent silica.

8. A glass electrode for pH determinations, comprising: a conductive membrane of glass, said glass having a three-component composition, the first component comprising essentially lithium oxide, the second component comprising essentially silica, and the third component representing the balance of the composition comprising essentially strontium oxide, the mole per cent of said second component minus the mole per cent of said first component being between 24 and 52 and the mole per cent of said first component plus 0.3 times the mole per cent of said second component being greater than 34.6.

9. A glass electrode for pH determinations, comprising: a conductive membrane of glass, said glass containing approximately 25 mole per cent lithium oxide, 7 mole per cent strontium oxide, and approximately 68 mole per cent silica.

10. A glass electrode for pH determinations, comprising: a conductive membrane of glass, said glass having a three-component composition, the first component comprising essentially lithium oxide, the second component comprising essentially silica, and the third component representing the balance of the composition comprising essentially barium oxide, the mole per cent of said second component minus the mole per cent of said first component being between 24 and about 53 and the mole per cent of said first component plus 0.3 times the mole per cent of said second component being greater than 34.6.

11. A glass electrode for pH determinations, comprising: a conductive membrane of glass, said glass containing approximately 24.3 mole per cent lithium oxide, 7 mole per cent barium oxide, and approximately 68.7 mole per cent silica.

12. A glass electrode for pH determinations, comprising: a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO, and MgO, said third component containing at least two of said materials when MgO is one of the materials selected from said group, the mole percentages of the three components being within the area ABCDHJ of Fig. 1.

13. A glass electrode for pH determinations, comprising: a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO, and MgO, said third component containing at least two of said materials when MgO is one of the materials selected from said group, the mole per cent of said second component minus the mole per cent of said first component being between 24 and 50 in compositions containing CaO, PbO, or MgO, being between 24 and about 52 in compositions containing SrO, and being between 24 and about 53 in compositions containing BaO, the mole per cent of said first component plus 0.3 times the mole per cent of said second component being greater than about 34.6.

14. A glass electrode for pH determinations, comprising: a conductive membrane of glass, said glass having a three-component composition, the first component comprising essentially lithium oxide, the second component comprising essentially silica, and the third component representing the balance of the composition and comprising essentially at least one material selected from the group consisting of CaO, SrO, BaO, PbO, and MgO, said third component containing at least two of said materials when MgO is one of the materials selected from said group, the mole per cent of said second component minus the mole per cent of said first component being between 24 and 50 in compositions containing CaO, PbO or MgO, being between 24 and about 52 in compositions containing SrO, and being between 24 and about 53 in compositions containing BaO, the mole per cent of said third component being less than about 20 mole per cent.

15. A glass electrode for pH determinations, comprising: a conductive membrane of glass, said glass having a three-component composition, the first component being an alkali metal oxide component comprising essentially lithium oxide, said second component comprising essentially silica, and the third component representing the balance of the composition and comprising essentially at least one material selected from the group consisting of CaO, SrO, BaO, PbO and MgO, said third component containing at least two of said materials when MgO is one of the materials selected from said group, the mole per cent of said second component minus the mole per cent of said first component being between 24 and 50 in compositions containing CaO, PbO or MgO, being between 24 and about 52 in compositions containing SrO, and being between 24 and about 53 in compositions containing BaO, the mole per cent of said third component being less than about 20 mole per cent.

16. A glass electrode for pH determinations, comprising a conductive membrane of glass of the following composition: a first alkali metal oxide component comprising essentially lithium oxide, and a second component comprising essentially silica with no more than a few mole per cent of any other metal oxide, the balance of the composition comprising essentially at least one material selected from the group consisting of CaO, CrO, BaO, PbO and MgO and containing at least two of said materials when MgO is one of the materials selected from said group, the mole per cent of said second component minus the mole per cent of said first component being between 24 and 50 in compositions containing CaO, PbO or MgO, being between 24 and about 52 in compositions containing SrO, and being between 24 and about 53 in compositions containing BaO, the mole per cent of said balance of said composition being 0–20 mole per cent.

17. A glass electrode for pH determinations, comprising a conductive membrane of glass of the following composition: a first alkali metal oxide component comprising essentially lithium oxide, and a second component comprising essentially silica with a small amount of an oxide of a trivalent metal in an amount not more than a few mole per cent, the balance of the composition comprising essentially at least one material selected from the group consisting of CaO, SrO, BaO, PbO and MgO and containing at least two of said materials when MgO is one of the materials selected from said group, the mole per cent of said second component minus the mole per cent of said first component being between 24 and 50 in compositions containing CaO, PbO or MgO, being between 24 and about 52 in compositions containing SrO, and being between 24 and about 53 in compositions containing BaO, the mole per cent of said balance of said compositions being 0-20 mole per cent.

18. A glass electrode for pH determinations, comprising a conductive membrane of glass of the following composition: a first component comprising essentially lithium oxide, and a second component comprising essentially silica, the balance of the composition comprising essentially at least one material selected from the group consisting of CaO, SrO, BaO, PbO, and MgO and containing at least two of said materials when MgO is one of the materials selected from said group, the mole per cent of said second component minus the mole per cent of said first component being between 24 and 50 in compositions containing CaO, PbO or MgO, being between 24 and about 52 in compositions containing SrO, and being between 24 and about 53 in compositions containing BaO, the mole per cent of said balance of said composition being 0-20 mole per cent.

19. A glass electrode for pH determinations, comprising a conductive membrane of a glass composition, said glass composition being in molar proportions, approximately one-fourth lithium oxide, approximately two-thirds silica and the balance substantially entirely barium oxide.

20. A glass electrode for pH determinations comprising a conductive membrane of a glass composition, said glass composition being in molar proportions, approximately one-fourth lithium oxide, approximately two-thirds silica and the balance substantially entirely at least one material selected from the group consisting of CaO, SrO, BaO, PbO, and MgO and containing at least two of said materials when MgO is one of the materials selected from said group.

HENRY H. CARY.
WARREN P. BAXTER.

REFERENCES CITED

The following references are of record in the file of this patent:

"Journal of American Chemical Society," January 1930, pages 29 through 36.

"Chemical Abstracts," vol. 29 (1935), pages 3579, 3580, abstract of article by Evstropev; ibid., vol. 37 (1943), page 5912, abstract of article by Tendeloo et al.

"Transactions of the Electrochemical Society," vol. 72 (1937), pages 129 through 137.

"Glass Electrode," by Dole, published in 1941 by John Wiley & Sons, pages 132, 133, 134.

Certificate of Correction

March 1, 1949.

Patent No. 2,462,843.

HENRY H. CARY ET AL.

It is hereby certified that errors appear in the printed specification of the above numbered patent requiring correction as follows:

Column 2, line 39, strike out the words "a first-mentioned oxide" and insert instead *an oxide of a divalent metal*; line 40, strike out "divalent" and insert instead *first-mentioned*; column 14, line 62, for "CrO" read *SrO*; and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*